(12) United States Patent
Komiya

(10) Patent No.: US 8,807,490 B2
(45) Date of Patent: Aug. 19, 2014

(54) CABLE PROTECTION AND GUIDE APPARATUS

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 124 days.

(21) Appl. No.: 13/558,882

(22) Filed: Jul. 26, 2012

(65) Prior Publication Data

US 2013/0032677 A1    Feb. 7, 2013

(30) Foreign Application Priority Data

Aug. 3, 2011 (JP) ................................. 2011-170393

(51) Int. Cl.
 *F16L 3/26* (2006.01)

(52) U.S. Cl.
 USPC ................ 248/49; 248/51; 59/78.1; 174/70 R

(58) Field of Classification Search
 CPC ...... F16G 13/16; H02G 11/006; H02G 11/00; H02G 3/0456; H02G 3/0475; F16L 3/015
 USPC ........ 248/49, 51, 52; 59/78.1, 900; 174/74 R, 174/70 R
 See application file for complete search history.

(56) References Cited

U.S. PATENT DOCUMENTS

| | | | | |
|---|---|---|---|---|
| 5,157,913 | A * | 10/1992 | Wehler et al. | 59/78.1 |
| 5,201,885 | A * | 4/1993 | Wehler et al. | 59/78.1 |
| 6,067,788 | A * | 5/2000 | Weber | 59/78.1 |
| 6,176,072 | B1 * | 1/2001 | Weber | 59/78.1 |
| 7,132,602 | B1 * | 11/2006 | Komiya | 174/70 R |
| 7,243,486 | B1 * | 7/2007 | Ikeda et al. | 59/78.1 |
| 7,249,452 | B2 * | 7/2007 | Komiya | 59/78.1 |
| 7,250,572 | B2 * | 7/2007 | Komiya | 174/70 R |
| 7,290,384 | B2 * | 11/2007 | Weber et al. | 59/78.1 |
| 7,428,808 | B2 * | 9/2008 | Utaki et al. | 59/78.1 |
| 7,536,849 | B2 * | 5/2009 | Wehler et al. | 59/78.1 |
| 8,220,243 | B2 * | 7/2012 | Komiya et al. | 59/78.1 |
| 8,397,479 | B2 * | 3/2013 | Wendig et al. | 59/78.1 |
| 8,505,272 | B1 * | 8/2013 | Komiya | 59/78.1 |
| 2006/0237212 | A1 * | 10/2006 | Komiya | 174/74 R |
| 2007/0151225 | A1 * | 7/2007 | Ikeda et al. | 59/78.1 |
| 2007/0228227 | A1 * | 10/2007 | Utaki et al. | 248/68.1 |
| 2008/0120958 | A1 * | 5/2008 | Utaki et al. | 59/78.1 |
| 2010/0181438 | A1 * | 7/2010 | Chauzu et al. | 248/49 |
| 2012/0126067 | A1 * | 5/2012 | Chauzu et al. | 248/49 |
| 2013/0212998 | A1 * | 8/2013 | Komiya | 59/78.1 |

FOREIGN PATENT DOCUMENTS

| | | | |
|---|---|---|---|
| JP | 2007092939 A | 4/2007 |
| JP | 2007247716 A | 9/2007 |
| JP | 2011038545 A | 2/2011 |

* cited by examiner

*Primary Examiner* — Bradley Duckworth

(74) *Attorney, Agent, or Firm* — Woodling, Krost and Rust

(57) ABSTRACT

There is provided a cable protection and guide apparatus that improves efficiency of cable insertion and maintenance when a connecting arm attached to a link plate by a hinge structure is disconnected. In order to removably connect the connecting arm to the link plate, the guide apparatus has the hinge structure composed of a hinge stem and a hook that is rotatably engaged with the hinge stem. The hinge structure has a disengagement preventing portion that prevents the hook from disengaging from the hinge stem and a rotation restricting portion that restricts the rotation of the connecting arm in the disconnected condition. The rotation restricting portion is composed of a link-side engagement element and an arm-side engagement element. In the rotation restricting condition effected by engagement of the link-side and arm-side engagement elements, a rotational angle of the connecting arm is an obtuse angle.

10 Claims, 8 Drawing Sheets

CABLE PROTECTION AND GUIDE APPARATUS

CROSS REFERENCE TO RELATED APPLICATIONS

This application claims the foreign priority benefit under Title 35, United States Code, §119 (a)-(d) of Japanese Patent Application No. 2011-170393, filed on Aug. 3, 2011 in the Japan Patent Office, the disclosure of which is herein incorporated by reference in its entirety.

BACKGROUND OF THE INVENTION

1. Field of the Invention

The present invention relates to a cable protection and guide apparatus configured to accommodate, protect and guide cables and hoses.

2. Related Art

The cable protection and guide apparatus comprises a plurality of link rows connected in a longitudinal direction and pluralities of first and second connecting arms. Each link row includes a pair of link plates separately disposed in a lateral direction from each other. The link plates adjoining in the longitudinal direction are connected articulately and bendably.

Cables are accommodated within an accommodating space formed by the pair of link plates of each link row and the first and second connecting arms connecting the pair of link plates of the link row.

Known cable protection and guide apparatus includes a structure for removably attaching the connecting arm, i.e., the first or second connecting arm, to the pair of link plates. A link-side engaging portion of the link plate and an arm-side engaging portion of the connecting arm engage each other as disclosed in Japanese Patent Application Laid-open Nos. 2011-38545 (FIGS. 3 to 15), 2007-247716 (FIGS. 4 to 13), and 2007-92939 (FIGS. 4 to 7).

When the cables press the connecting arms from the inside toward the outside, the connecting arms are disengaged from the link plates by an external force applied by the cables to the connecting arm, i.e., an arm disengagement phenomenon, occurs.

Then, in order to prevent the arm disengaging phenomenon, an arrangement of disengagement preventing portions is provided in Japanese Patent Application Laid-open Nos. 2011-38545 (FIGS. 3 to 15) and 2007-247716 (FIGS. 4 to 13).

The attachment structure for removably attaching the connecting arm to the link plate includes a hinge stem (corresponds to a link-side hinge portion) provided in the link plate and a hook (corresponds to an arm-side hinge portion) provided in the connecting arm. The hook engages the hinge stem rotatably centering on a rotation axis that extends along a longitudinal direction of the apparatus. When the cable protection and guide apparatus is in a disconnected state because the connecting arms are disengaged from one link plate of the pair of link plates, the hook is liable to be disengaged from the hinge stem. External forces applied by the cables inserted into the accommodating space may rotate one of the connecting arms engaged with one of the hinge stems even when the other connecting arm is attached to one link plate of the pair of link plates.

In such a case, the disengagement preventing portions for preventing the arm disengaging phenomenon are provided on the link plate and the connecting arm.

When the cables are inserted into the accommodating space such that the hook of the connecting arm in the disconnected condition engages the hinge stem of the link plate, it is necessary to return the connecting arm to the connected condition by rotating the arm after completing the work of inserting the cable into the accommodating space. Therefore, it takes time to put the connecting arm into the connected condition.

Still further, it is necessary to increase rigidity of the disengagement preventing engage portion in order to enhance the effect of preventing the arm disengaging phenomenon. Therefore, when the disengagement preventing engage portions are provided in the hinge stem of the link plate and the hook of the connecting arm comprises the hinge structure, the hinge stem and the hook are enlarged. Thus, it is difficult to make the hinge stem and the hook smaller.

Still further, when the first connecting arm is in the connected condition and the second connecting arm is in the disconnected condition with respect to one pair of link plates and when the cables are inserted in the accommodating space in a condition in which the accommodating space is opened upward with the first connecting arm being a bottom, the accommodating space lacks integrity when inserting the cables therein. Thus, there is a problem that it takes extra time to insert the cables into the accommodating space.

Still further, when the hook is removed from or attached to the hinge stem or when an operator forcibly engages or disengages the disengagement preventing engage portions, there is a problem that parts including the engaging portions that rub with each other wear quickly.

Still further, if a gap greater than a minute gap necessary for rotation is created between the hinge stem and the hook, an abutment (or rattling) is caused between the hinge stem and the hook in rotating the connecting arm and the connecting arm is not smoothly rotated. Therefore, there are problems that wear is increased where the hinge stem abuts the hook and that it takes time to rotate the arm.

Therefore, there is a need for a cable protection and guide apparatus capable of smoother and quicker operation when the hinge structure is in the disengaged condition.

There is also a need for a smaller cable protection and guide apparatus having disengagement preventing portions that prevent the arm disengaging phenomenon.

Still further, there is a need for a cable protection and guide apparatus configured to improve durability of the attachment structure including the hinge structure for attaching the connecting arms to the link plates.

SUMMARY OF THE INVENTION

In order to solve the aforementioned problems, according to a first aspect of the invention, there is provided a cable protection and guide apparatus, comprising:

a link row group composed of a plurality of link rows connected in a longitudinal direction of the guide apparatus;

pluralities of first and second connecting arms;

each link row being composed of a pair of link plates disposed separately from each other in a transverse direction of the guide apparatus;

the link plates adjacent each other in the longitudinal direction being articulately and bendably connected together;

an attachment structure for removably attaching at least one connecting arm of the first and second connecting arms to the link plate having a hinge structure composed of a link-side hinge portion of the link plate and an arm-side hinge portion of the connecting arm;

the connecting arm being put into a connected condition of connecting the pair of link plates and a disconnected condition of releasing the connected condition;

the arm-side hinge portion engaging the link-side hinge portion in the connected condition, and engaging the link-side hinge portion rotatably so that the connecting arm rotates centering on an axis of rotation extending in the longitudinal direction in the disconnected condition;

cables accommodated within an accommodating space formed by the pair of link plates of each link row of the link row group and by the first and second connecting arms connecting the pair of link plates of the link row;

the hinge structure has a rotation restricting portion that restricts the rotation of the connecting arm in the disconnected condition;

the rotation restricting portion is composed of link-side rotation restricting engage portions provided around the link-side hinge portion and an arm-side rotation restricting engage portion provided on the arm-side hinge portion; and, a restricting rotation angle, i.e., a rotation angle of the connecting arm from the connected condition, is an obtuse angle in the rotation restricted condition in which the rotation of the connecting arm is restricted by the engagement of the link-side rotation restricting engage portions and the arm-side rotation restricting engage portion.

According to a second aspect of the invention, the link-side hinge portion has a link-side surface that surrounds the rotation axis. The arm-side hinge portion has an arm-side circumferential surface that surrounds the rotation axis and is opposed radially to the link-side surface within the rotation range of the connecting arm. The hinge structure has a disengagement preventing portion that prevents an arm disengaging phenomenon of disengaging the arm-side hinge portion from the link-side hinge portion. Disengagement can be caused by external force acting on the connecting arm from the cables. The disengagement preventing portion is composed of a pair of link-side disengagement preventing engage portions provided on the link-side surface and arm-side disengagement preventing engage portions provided on the arm-side. When the connecting arm is in the connected condition, the arm disengaging phenomenon is prevented by engaging the link-side disengagement preventing engage portions with the arm-side disengagement preventing engage portions.

According to a third aspect of the invention, the arm-side disengagement preventing engage portion also functions as the arm-side rotation restricting engage portion.

According to a fourth aspect of the invention, the link-side hinge portion includes first portions and a second portion. The first portions of the link-side hinge include a guide surface that contacts a disengagement preventing engage portion of the arm-side within a predetermined rotation range. The second portion of the link-side hinge has a non-contact portion that does not contact a disengagement preventing engage portion of the arm-side within the predetermined rotation range.

According to a fifth aspect of the invention, when the connecting arm is located at a specific rotational position within the predetermined rotation range, the arm-side hinge portion is removable from the link-side hinge portion in a removable direction. The non-contact portion of the link-side hinge portion has a shape that does not contact the arm-side disengagement preventing engage portion when the connecting arm is moved in the removable direction.

According to a sixth aspect of the invention, the connecting arm has a body portion extending between the pair of link plates in the connected condition. The pair of arm-side hinge portions extends from both end portions of the body portion in the transverse direction. The attachment structure has a disengagement preventing attachment structure for preventing the arm disengaging phenomenon. The disengagement preventing attachment structure is composed of a second link-side disengagement preventing engage portions provided on the respective link plates and a second arm-side disengagement preventing engage portion provided on the body portion. When the first connecting arm is in the connected condition, the engagement of the second link-side disengagement preventing engage portions with the second arm-side disengagement preventing engage portions prevents the arm disengaging phenomenon.

According to a seventh aspect of the invention, the first connecting arm is removably attached to the pair of link plates by the attachment structure. The second connecting arm is removably attached to the pair of link plates. The attachment structure has the disengagement preventing attachment structure for preventing the arm disengaging phenomenon. The disengagement preventing attachment structure is composed of a second link-side disengagement preventing engage portions provided on the respective link plates and a second arm-side disengagement preventing engage portion provided in the first connecting arm. When the first connecting arm is in the connected condition, the arm disengaging phenomenon can be prevented by the engagement of the link-side disengagement preventing engage portion with the arm-side disengagement preventing engage portion and by the engagement of the second link-side disengagement preventing engage portions with the second arm-side disengagement preventing engage portions.

According to an eighth aspect of the invention, the hinge structure has a return restricting portion that restricts the connecting arm from rotating from the rotation restricted condition to the connected condition. The return restricting portion is composed of a link-side return restricting engage portion provided in the link-side hinge portion and an arm-side return restricting engage portion provided on the arm-side hinge portion. In the return restricting condition in which the rotation of the connecting arm is restricted by the engagement of the arm-side and link-side return restricting engage portions, a return restricting rotation angle which is the rotation angle of the connecting arm is an obtuse angle smaller than the restricting rotation angle.

According to a ninth aspect of the invention, each of the link plates and the connecting arms is an integrally molded member. The hardness of a material forming one member among the link plates and the connecting arms is smaller than hardness of a material forming the other one among the link plates and the connecting arms. Simply put, the link plates can be harder than the connecting arms or the connecting arm can be harder than the link plates.

ADVANTAGEOUS EFFECTS OF THE INVENTION

The cable protection and guide apparatus of the invention comprises the link row group composed of the plurality of link rows connected in the longitudinal direction of the guide apparatus and pluralities of first and second connecting arms. Each link row is composed of the pair of link plates disposed separately from each other in the transverse direction of the guide apparatus. The link plates adjacent each other in the longitudinal direction are articulately and bendably connected. The attachment structure for removably attaching at least one connecting arm of the first and second connecting arms to the link plate has the hinge structure composed of the link-side hinge portion of the link plate and the arm-side hinge portion of the connecting arm. The arm-side hinge portion engages with the link-side hinge portion in the connected condition and engages the link-side hinge portion rotatably so that the connecting arm rotates on the axis of rotation. Cable(s) and/or hose(s) are accommodated within the accommodating space formed by the pair of link plates of each link row of the link row group and by the first and second connecting arms connecting the pair of link plates of the link row.

The invention includes a plurality of link rows. Each of the link rows includes a pair of link plates laterally and separately disposed from each other. Each of the pair of link plates includes left and right link plates. Each of the left and right link plates are articulately connected to each other in a longitudinal direction enabling the link plates to form a flexional circumferential bend having a flexional inner circumferential side and flexional outer circumferential side during bending. Each of the link plates includes a flexional inner circumferential side residing during bending on the flexional inner circumferential side of the bend. Each of the link plates includes a flexional outer circumferential side residing during bending on the outer flexional circumferential side of the bend. Each link row includes first and second connecting plates configured to crosslink the left and right link plates respectively on the flexional inner and outer circumferential sides, respectively. The cable is inserted through the link rows between a stationary end and a mobile end.

Thus, it is possible to protect and guide the cables and/or hoses within the accommodating space.

Because the first connecting arm rotates centering on the axis of rotation that extends in the longitudinal direction, and because the first connecting arm in the disconnected condition is rotated while being engaged with the longitudinal direction hinge portion, it is possible to insert the cables and/or hoses into the accommodating space efficiently. The cable protection and guide apparatus has the following effects peculiar to the invention.

That is, according to the first aspect of the cable protection and guide apparatus of the invention, the hinge structure has the rotation restricting portion that restricts the rotation of the connecting arm in the disconnected condition. The rotation restricting portion is composed of the link-side rotation restricting engage portions provided around the link-side hinge portion and the arm-side rotation restricting engage portion provided on the arm-side hinge portion. The restricting rotation angle, i.e., the rotation angle of the connecting arm from the connected condition, is the obtuse angle in the rotation restricted condition in which the rotation of the connecting arm is restricted by the engagement of the link-side rotation restricting engage portions and the arm-side rotation restricting engage portion.

Because the restricting rotation angle set by the engagement of the link-side rotation restricting engage portion with the arm-side rotation restricting engage portion is the obtuse angle, it is possible to reduce the time of rotating the connecting arm into the connected condition after inserting the cable into the accommodating space. It takes longer to rotate the connecting arm to a rotation angle of 180° or more.

According to the second aspect of the cable protection and guide apparatus of the invention, the link-side hinge portion has the link-side circumferential surface that surrounds the rotation axis in the circumferential direction. The arm-side hinge portion has the arm-side circumferential surface that is the circumferential surface surrounding the rotation axis in the circumferential direction and is opposed radially to the link-side circumferential surface within the rotation range of the connecting arm. The hinge structure has the disengagement preventing portion that prevents the arm disengaging phenomenon of disengaging the arm-side hinge portion from the link-side hinge portion caused by the external force acting on the connecting arm from the cable. The disengagement preventing portion is composed of the pair of link-side disengagement preventing engage portions provided on the link-side circumferential surface and the arm-side disengagement preventing engage portions provided on the arm-side circumferential surface. When the connecting arm is in the connected condition, the arm disengaging phenomenon is prevented by engaging the link-side disengagement preventing engage portion with the arm-side disengagement preventing engage portion.

With this arrangement, the disengagement preventing portion that prevents the arm disengaging phenomenon caused by external force from the cable is provided on the arm-side circumferential surface and the link-side circumferential surface.

Therefore, it is possible to downsize the link-side and arm-side hinge portions on which the link-side and arm-side disengagement preventing engage portions are provided, i.e., to downsize the hinge structure.

Accordingly, it is possible to use the hinge structure having the disengagement preventing portion in a small cable protection and guide apparatus.

According to the third aspect of the cable protection and guide apparatus of the invention, because the arm-side disengagement preventing engage portion 161 also functions as the arm-side rotation restricting engage portion, the structure of the arm-side hinge portion 160 in which the disengagement preventing engage portion and the rotation restricting engage portion are provided is simplified. Then, it is possible to downsize the arm-side and the link-side hinge portions, i.e., the hinge structure, while reducing the cost of the cable protection and guide apparatus.

According to the fourth aspect of the cable protection and guide apparatus of the invention, one hinge portion among the link-side and arm-side hinge portions is divided into the first portions and the second portion in the rotation axis direction, the first portion has the guide surface that contacts the other disengagement preventing engage portion which is the link-side or arm-side disengagement preventing engage portion provided on the other hinge portion among the link-side and arm-side hinge portions within the predetermined rotation range and guides the connecting arm in the rotational direction, and the second portion has the non-contact portion that does not contact the other disengagement preventing engage portion within the predetermined rotation range.

This arrangement facilitates the removal of the arm-side hinge portion provided with the arm-side disengagement preventing engage portion from the link-side hinge portion by utilizing the non-contact portion of one hinge portion among the link-side and arm-side hinge portions composing the hinge structure.

This arrangement also improves use of the apparatus because the connecting arm can be rotated smoothly by rotating the connecting arm in the condition in which the other disengagement preventing engage portion is guided by the guide surface.

According to the fifth aspect of the cable protection and guide apparatus of the invention, when the connecting arm is located at the specific rotational position within the predetermined rotation range, the arm-side hinge portion is removable from the link-side hinge portion in the removable direction in the radial direction, and the non-contact portion has the shape that does not contact the other disengagement preventing engage portion when the connecting arm is moved in parallel with the removable direction.

This arrangement facilitates the removal of the arm-side hinge portion from the link-side hinge portion and improves assemble-ability of the connecting arm having the arm-side hinge portion provided with the arm-side disengagement preventing engage portion to the respective link plates having the link-side hinge portion provided with the link-side disengagement preventing engage portion.

According to the sixth aspect of the cable protection and guide apparatus of the invention, the connecting arm has a body portion extending between the pair of link plates in the connected condition and the pair of arm-side hinge portions extending from both end portions of the body portion in the transverse direction. The attachment structure has the disengagement preventing attachment structure for preventing the arm disengaging phenomenon. The disengagement preventing attachment structure is composed of the second link-side disengagement preventing engage portions provided on the respective link plates and the second arm-side disengagement preventing engage portion provided on the body portion. When the first connecting arm is in the connected condition, the engagement of the second link-side disengagement preventing engage portions with the second arm-side disengagement preventing engage portions prevents the arm disengaging phenomenon.

With this arrangement, it is possible to enhance the effect of preventing the arm disengaging phenomenon further because the disengagement preventing attachment structure is provided in addition to the disengagement preventing portion of the hinge structure between the respective link plates and the first connecting arm.

In addition to that, because the second arm-side disengagement preventing engage portion is provided in the body portion disposed between the pair of link plates when the connecting arm is in the connected condition, it is possible to release the engagement between the second link-side disengagement preventing engage portion and the arm-side disengagement preventing engage portion while engaging both hinge portions when the connecting arm is in the disconnected condition.

According to the seventh aspect of the cable protection and guide apparatus of the invention, the first connecting arm is removably attached to the pair of link plates by the attachment structure. The second connecting arm is removably attached to the pair of link plates. The attachment structure has the disengagement preventing attachment structure for preventing the arm disengaging phenomenon. The disengagement preventing attachment structure is composed of the second link-side disengagement preventing engage portions provided on the respective link plates and the second arm-side disengagement preventing engage portion provided in the first connecting arm. The disengagement preventing portion and the disengagement preventing attachment structure are disposed by interposing the rotation axis in the transverse direction. When the first connecting arm is in the connected condition, the arm disengaging phenomenon can be prevented by the engagement of the link-side disengagement preventing engage portion with the arm-side disengagement preventing engage portion and by the engagement of the second link-side disengagement preventing engage portions with the second arm-side disengagement preventing engage portions.

Then, it is possible to enhance the effect for preventing the arm disengaging phenomenon further because the disengagement preventing attachment structure is provided between the link plates and the first connecting arm, in addition to the disengagement preventing portions of the hinge structure.

The disengagement preventing portion and the disengagement preventing attachment structure disposed on the both sides of the rotation axis in the transverse direction prevent the first connecting arm from rotating when the first connecting arm is in the connected condition and the respective second connecting arms are in the condition of not connecting the pair of link plates. This helps prevent the respective link plates from rotating and falling around the axis of rotation due to the external force acting from the cable on the respective link plates or due to the weight of the respective link plates.

According to the eighth aspect of the cable protection and guide apparatus of the invention, the hinge structure has the return restricting portion that restricts the connecting arm from rotating from the rotation restricted condition to the connected condition. The return restricting portion is composed of the link-side return restricting engage portion provided in the link-side hinge portion and the arm-side return restricting engage portion provided on the arm-side hinge portion. In the return restricting condition in which the rotation of the connecting arm is restricted by the engagement of the arm-side and link-side return restricting engage portions, the return restricting rotation angle which is the rotation angle of the connecting arm is the obtuse angle smaller than the restricting rotation angle.

This arrangement allows the rotation angle of the first connecting arm to be kept stably in the obtuse angle state within the range of the restricting rotation angle set by the rotation restricting portion and the return restricting rotation angle set by the return restricting portion, so that it is possible to improve the efficiency of inserting the cable into the accommodating space.

According to the ninth aspect of the cable protection and guide apparatus of the invention, each of the link plates and the connecting arms is an integrally molded member. The hardness of the material forming one member among the link plates and the connecting arms is smaller than the hardness of the material forming the other one among the link plates and the connecting arms.

Therefore, parts provided in one member whose hardness is smaller than the other member readily deform when parts of the respective link plates and the connecting arm rub each other. Thus, the hook arm-side hinge portion is removably attached to the link-side hinge portion when the operator forcibly engages or disengages the engage portions of the link plates and the connecting arms.

Accordingly, it is possible to reduce wear of the attachment structures including the hinge structure and to improve durability of the attachment structures of the cable protection and guide apparatus.

PREFERRED EMBODIMENT OF THE INVENTION

Embodiment

An embodiment of a cable protection and guide apparatus of the invention will be explained with reference to FIGS. 1 through 10.

Figure 1:
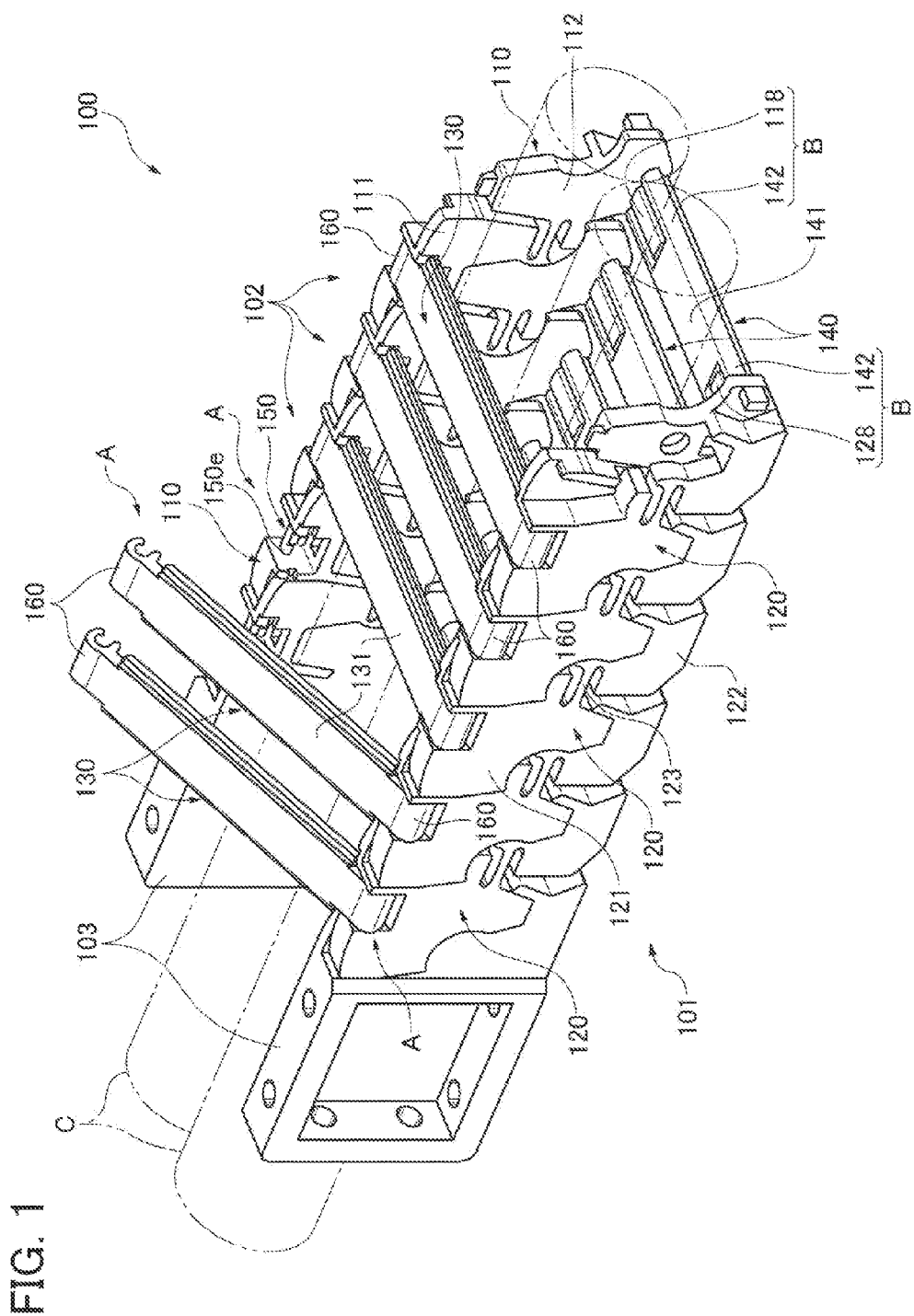
FIG. 1 is a perspective view of part of a cable protection and guide apparatus according to an embodiment of the invention.

The cable protection and guide apparatus 100 (referred to simply as 'guide apparatus' or 'apparatus' hereinafter) of the embodiment of the invention shown in FIG. 1 is included in a machine not shown that includes cables and/or hoses and is used to protect and guide the cables and/or hoses. The machines described above include semiconductor equipment, pharmaceutical medicine testing apparatuses, vehicular door opening/shutting devices, work machines and the like.

In order to accommodate the movable cables and/or hoses in the machine described above, the cable protection and guide apparatus 100 is configured to have flexibility so as to be able to take straight or bending posture locally or as a whole corresponding the movements of the cables and/or hoses between the movable portion and the stationary portion of the apparatus.

The cable protection and guide apparatus 100 comprises a link row group 101 composed of a plurality of link rows 102 arrayed in a longitudinal direction and bendably connected with each other and pluralities of first and second connecting arms 130, 140.

The link row group 101 is provided with two attachments 103 (FIG. 1 shows the attachment 103 that composes one end of the link row group 101) attached respectively to a movable portion and a stationary portion of the machine. Link rows 102 and the link plates are bendably connected to adjacent link rows 102 in the longitudinal direction by arrangement similar to second and third arrangements described later (see FIGS. 2 and 3).

The invention includes a plurality of link rows 102. Each of the link rows 102 includes a pair of link plates 110, 120 laterally and separately disposed from each other. Each of the pair of link plates includes left 120 and right 110 link plates. Each of the left and right link plates are articulately connected to each other in a longitudinal direction enabling the link plates to form a flexional circumferential bend having a flexional inner circumferential side and flexional outer circumferential side during bending. Each of the link plates includes a flexional inner circumferential side residing during bending on the flexional inner circumferential side of the bend. Each of the link plates includes a flexional outer circumferential side residing during bending on the outer flexional circumferential side of the bend. Each link row 102 includes first and second connecting plates 130, 140 configured to crosslink the left and right link plates respectively on the flexional inner and outer circumferential sides, respectively. The cable is inserted through the link rows 102 between a stationary end and a mobile end.

Each link row 102 is composed of a pair of first and second link plates 110 and 120 disposed separately from each other in a transverse direction. The first link plate 110 is sometimes referred to herein as the right link plate. The second link plate 120 is sometimes referred to herein as the left link plate.

The first link plates 110 and the second link plates 120 respectively adjacent each other in the longitudinal direction are connected articulately and bendably.

The first and second connecting arms 130 and 140 are disposed separately from each other in the vertical direction to connect the pair of link plates 110, 120 of each link row 102. The connecting arms 130, 140 are removably attached to the pair of link plates 110 and 120 respectively by means of attachment structures A and B described later.

The first connecting arm 130 is attached to the pair of link plates 110, 120 rotatably centering on a rotation axis L (see FIGS. 6A and 6B) that extends along the longitudinal direction.

It is noted that the transverse direction is a direction orthogonal to the rotation axis L.

The connecting arm 130 transversely crosslinks the pair of link plates 110, 120 in each of the plurality of link rows 102. The connecting arm 130 connects the pair of link plates 110, 120 on a bending outer circumferential side of the respective link plates 110, 120. Link plate 110 is referred to herein as the right side link plate (first link plate) and is generally on the right side of the cable protection and guide apparatus when viewing FIG. 1. Link plate 120 is referred to herein as the left side link plate (second link plate) and is generally on the left side of the cable protection and guide apparatus when viewing FIG. 1.

The connecting arm 140 transversely crosslinks the pair of link plates 110, 120 in each of the plurality of link rows 102. The connecting arm 140 connects the pair of link plates 110, 120 on a bending inner circumferential side of the respective link plates 110 and 120.

First connecting arms 130 and second connecting arms 140 are separately disposed respectively in the longitudinal direction in the cable protection and guide apparatus 100.

Link row group 101 extends in the longitudinal direction in the condition in which the link rows 102 adjacent in the longitudinal direction are bendably connected. Link rows 102 are integrated by being connected by the first and second connecting arms 130, 140.

Cables and hoses, C, are guided and movable by the cable protection and guide apparatus 100. Cables C are accommodated within a space (referred to as the "accommodating space" hereinafter) formed by the pair of link plates 110, 120 of each link row 102 of the link row group 101, and the first 130 and second 140 connecting arms. The link rows are bendably connected and extend in the longitudinal direction.

The first link plates 110, the second link plates 120, the first connecting arms 130 and the second connecting plates 140 have, respectively, the same structures.

The link plates 110 and 120, the connecting arms 130 and 140 and the attachment portion 103 are, respectively, each molded integrally by materials forming them, e.g., plastics.

The hardness of the material, e.g., polyamide 66, forming the link plates 110, 120 is not as hard as the material, e.g., polyacetal or fiber reinforced polyamide, forming the first and second connecting arms 130, 140.

Figure 2:
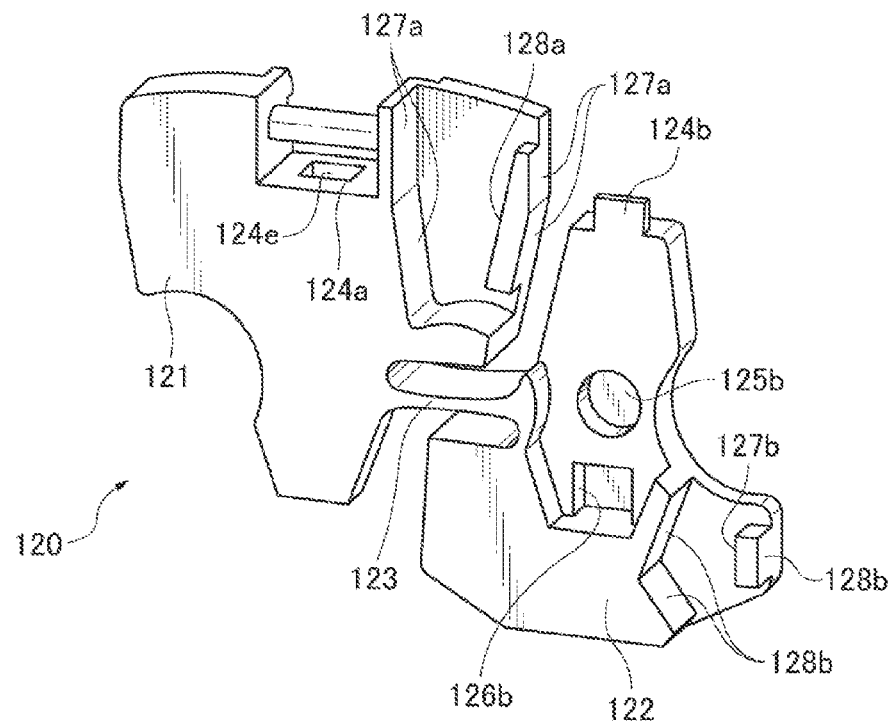
FIG. 2 is a perspective view of a link plate of the cable protection and guide apparatus shown in FIG. 1 seen from the outside of the cable protection and guide apparatus.
Figure 3:
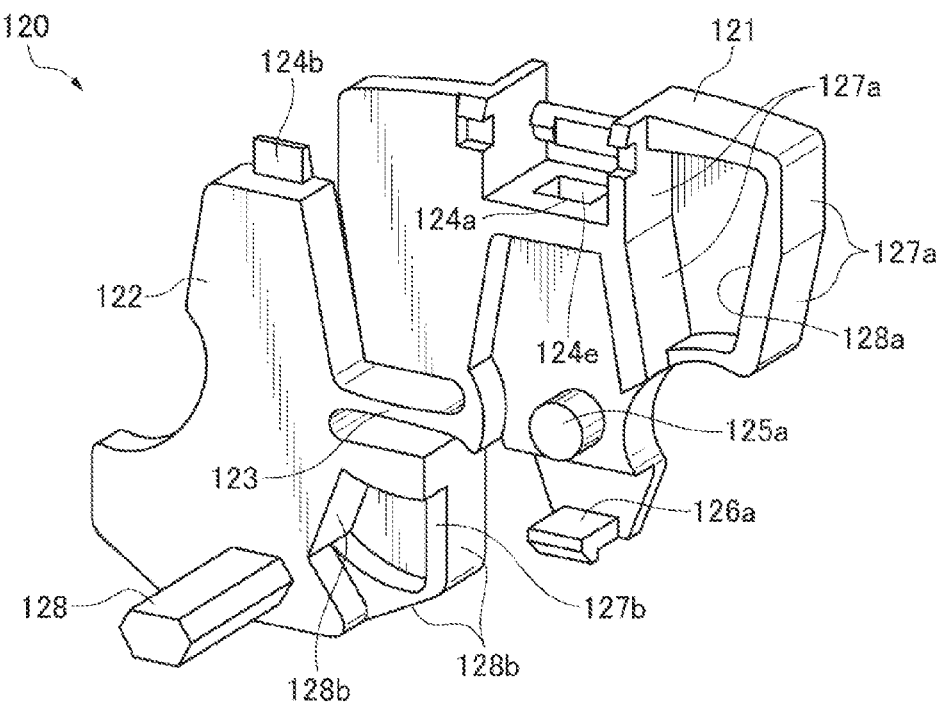
FIG. 3 is a perspective view of the link plate in FIG. 2 seen from the inside of the cable protection and guide apparatus.

While the structure for connecting adjacent link plates 110 and 120 in the longitudinal direction will now be explained with reference to FIGS. 1 through 3, and centering on the second link plate 120, the same applies also to the first link plate 110.

The link plate 120 has a first connecting portion 121, a second connecting portion 122 and a joint portion 123 that connects the first connecting portion 121 with the second connecting portion 122. Link plate 120 is flexible.

The link plate 120 is provided with the first connecting structure 124b, 124a, 124e configured to removably connect the first connecting portion 121 with a second connecting portion 122 of the next adjacent link plate in the longitudinal direction. Second and third connecting structures 125a, 125b and 126a, 126b removably connect the second connecting portion 122 with a first connecting portion 121 of adjacent link plate 120 in the longitudinal direction.

The first connecting portion 121 of link plate 120 includes a fitting portion 124a provided with a fitting hole 124e in the first connecting portion 121. The fitting hole 124e of the first connecting portion removably engages the first fitting projection 124b.

The second connecting structure is composed of a fitting projecting portion 125a of the first connecting portion 121 and a fitting concave portion 125b of the second connecting portion 122. The fitting projecting portion 125a of the first connecting portion 121 interfits and engages the fitting concave portion 125b of an adjacent link plate 120.

The third connecting structure is composed of a fitting projecting portion 126a of the first connecting portion 121 and a fitting concave portion 126b of the second connecting portion 122. The fitting projecting portion 126a of the first connecting portion 121 fits into the fitting concave portion 126b.

The link plate 120 is also provided with a straight posture keeping structure 127a, 127b that keeps the cable protection and guide apparatus 100 in a straight posture and a bending posture restricting structure 128a, 128b that restricts a bending posture of the cable protection and guide apparatus 100 in a maximum bending posture.

The straight posture keeping structure is composed of first straight posture holding surface 127a on the bending outer circumferential surface and a second straight posture holding surface 127b on the bending internal circumferential surface.

In the same manner, the bending posture restricting structure is composed of first bending posture holding surfaces 128a on the bending outer circumferential surface and a second bending posture holding surfaces 128b on the bending internal circumferential surface.

The cable protection and guide apparatus 100 keeps the straight posture by abutting the first straight posture holding surfaces 127a and the second straight posture holding surfaces 127b respectively with each other while separating the first bending posture restricting surfaces 128a and the second bending posture restricting surfaces 128b respectively from each other.

The cable protection and guide apparatus 100 can keep a maximum bending posture or an intermediate bending posture between the straight posture and the maximum bending posture by abutting the first bending posture restricting surfaces 128a and the second bending posture restricting surfaces 128b with each other. At the same time, the first straight posture holding surfaces 127a and the second straight posture holding surfaces 127b are separated from each other.

Figure 4:
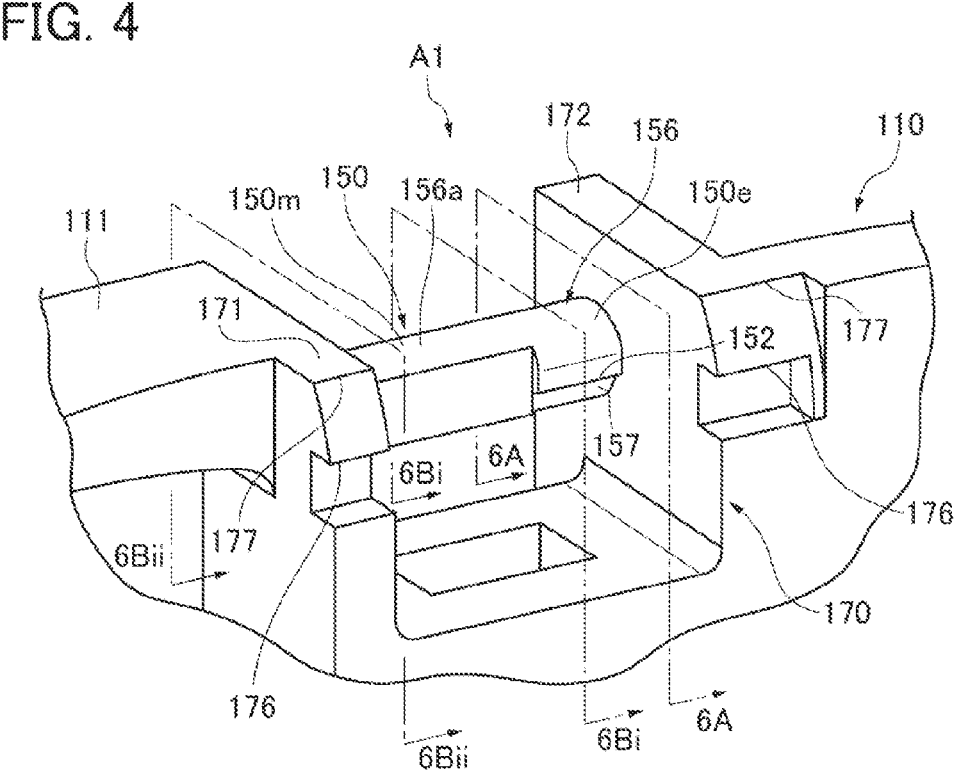
FIG. 4 is a perspective view of the main part of the link plate of the cable protection and guide apparatus in FIG. 1.
Figure 5:
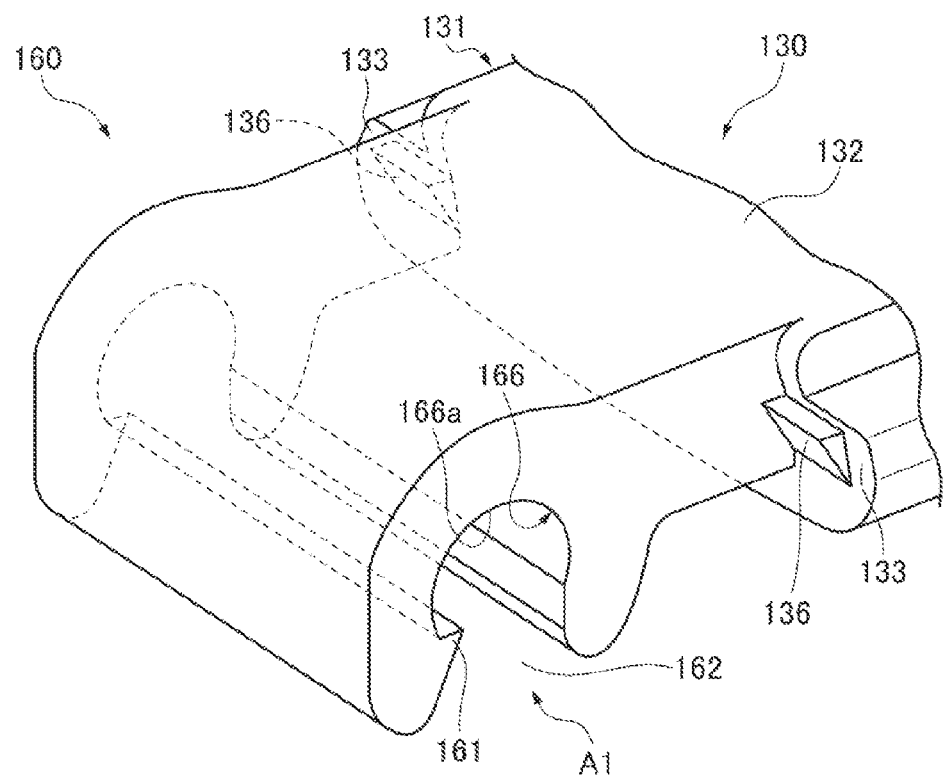
FIG. 5 is a perspective view of the main part of a connecting arm of the cable protection and guide apparatus in FIG. 1.

As shown in FIGS. 1, 4 and 5, the first connecting arm 130 is attached to and connects the pair of link plates 110 and 120 by the attachment structure A. When the first connecting arm 130 crosslinks the pair of link plates 110 and 120, the connecting arm is referred to as being in the "connected state". When the first connecting arm 130 is not attached to the associated pair of link plates 110 and 120, and does not crosslink the pair of link plates 110 and 120, i.e., the connecting arm is referred to as being in the "disconnected state".

FIG. 1 shows some of the first connecting arms 130 in the connected condition or connected state. FIG. 1 further shows some of the connecting arms 130 in the disconnected condition or disconnected state.

Each connecting arm 130 has a plate-like body portion 131 that keeps the cables, C, from within the accommodating space by abutting the cables, C, and a pair of hooks 160 configured to be removably attached respectively to the first connecting portions 111 and 121 of the pair of link plates 110 and 120.

The body portion 131 is disposed between the pair of link plates 110 and 120 and extends in the transverse direction in the connected condition.

The pair of hooks 160 extends transversely in opposite directions from both end portions 132 of the body portion 131.

As shown in FIG. 1, the second connecting arm 140 takes a state in which the second connecting arm 140 is attached to and connects the pair of link plates 110 and 120 (connected state) by an attachment structure B provided in the second connecting arm 140 and the pair of link plates 110 and 120. When the second connecting arm 140 is not attached to at least one of the pair of link plates 110 and 120 and does not connect the pair of link plates 110 and 120, i.e., the connected condition is released and is referred to as the "disconnected state" hereinafter.

The second connecting arm 140 has a plate-like body portion 141 that prevents the cables, C, from escaping the accommodating space. The second connecting arm 140 includes a pair of engaging portions 160 configured to be removably attached, respectively, to the second connecting portions 112 and 122 of the pair of link plates 110 and 120.

The attachment structure B is composed of bar-like engaging portions 118, 128 (see also FIG. 3) of the second connecting portions 112 and 122 of the respective link plates 110, 120 and a pair of concave engaging portions 142. The pair of engaging portions 142 is provided respectively at both transverse end portions of the second connecting arm 140.

Both engaging portions 118, 128 of link plates 110, 120 and engaging portions 142 are provided with a disengagement preventing structure not shown having a concave-convex structure composed of projections and grooves that extend in the transverse direction and engage with each other to prevent the engaging portions 142 from disengaging from the respective engaging portions 118, 128. Cables, C, can create a force which acts on the second connecting arm 140 that, but for the structure just described, would create an arm disengaging phenomenon described later in connection with the first connecting arm 130.

It is noted that the engaging portions 118, 142 engaging each other, and the engaging portions 128, 142 engaging each other, in the attachment structure B can be forcibly disengaged when an operator applies a force to the second connecting arm 140.

The cable protection and guide apparatus 100 will be explained below in regard to the attachment structure A with reference to FIGS. 1, and, 4 through 10.

It is noted that the following explanation will be made mainly based on the attachment structure A between the first connecting arm 130 and the first link plate 110 for the convenience of explanation. The same explanation applies to the attachment structure A between the first connecting arm 130 and the second link plate 120.

As shown in FIGS. 1, and 4 through 6, the attachment structure A comprises the link plate 110 and the first connecting arm 130. The attachment structure A allows the connecting arm 130 to be removably connected to the link plate 110. Link plate 110 has a hinge structure A1 and a disengagement preventing attachment structure.

The hinge structure A1, illustrated in FIGS. 4 and 5, includes a hinge stem 150 as a link-side hinge portion of the first connecting portion 111 of the link plate 110 (corresponds to the first connecting portion 121 of the link plate 120) and the hook 160 as an arm-side hinge portion of the first connecting arm 130.

The disengagement preventing attachment structure includes: a pair of link-side engagement elements 176 (concave or stepped in the present embodiment) in the link plate; and, a pair of arm-side engagement elements 136 (projection in the present embodiment) on the first connecting arm 130.

It is noted that the terms "link-side engagement element" and "arm-side engagement element" are parts provided respectively at the link plates 110 and 120 and the first connecting arm 130 and having shapes engageable with each other. Typically, when one engagement element is a projection, the other engagement element is a concavity (including parts forming a groove or hole), stepped, cornered or indented.

Here, a direction in parallel with the rotation axis L will be referred to as a rotation axis (or axis of rotation) direction, and radial and circumferential directions centering on the rotation axis L will be referred to simply and respectively as a radial direction and a circumferential direction.

In the hinge structure A1, the hook 160 engages with the hinge stem 150 when the first connecting arm 130 is in the connected condition. In the disconnected condition, the hinge stem 150 is rotatably centered on the rotation axis L such that the first connecting arm 130 rotates about rotation axis (axis of rotation) L1 that extends in the longitudinal direction.

The hinge stem 150 that defines the axis of rotation L extends in the longitudinal direction between a pair of side walls 171 and 172 of a storage portion 170 provided in the first connecting portion 111 of the link plate. Hinge stem 150 is integrally connected with the both side walls 171 and 172 that are separated/spaced apart as illustrated in FIG. 4. The hinge stem 150 is supported by walls 171, 172 and integrally molded therewith.

A length of the hinge stem 150 in the rotation axis direction, i.e., a distance between the both side walls 171 and 172 in the rotation axis L, is slightly longer than a width in the rotation axis L of the hook 160 accommodated within the storage portion 170 in engaging with the hinge stem 150. In other words, the hinge stem 150 is longer than the width of the hook 160.

The hook 160 is provided with a cutaway opening 162, through which the hinge stem 150 can pass in the radial direction. The hook 160 has a partial cylindrical shape whose section is arc-shaped (or C-shaped in section).

Figure 6A:
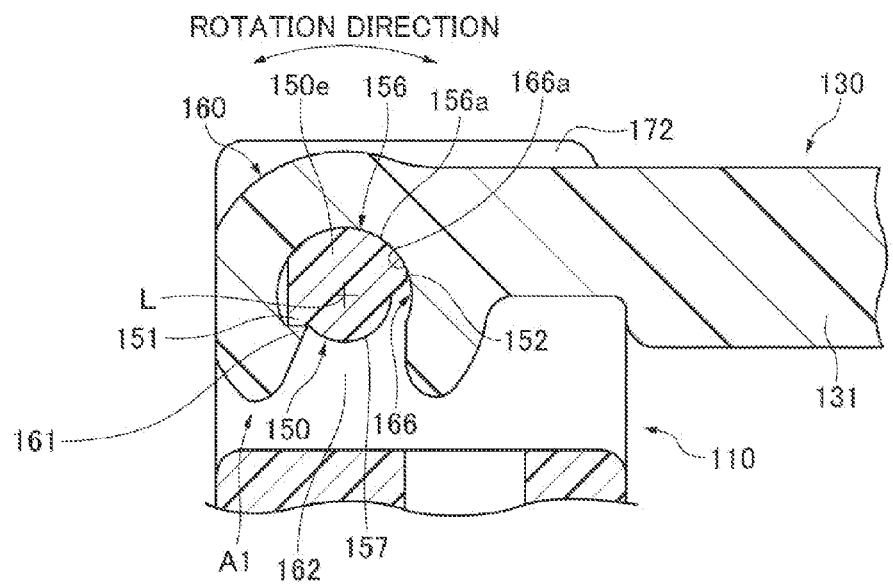
FIG. 6A is a section view taken along a line 6A-6A in FIG. 4 illustrating a state when the link plate of the cable protection and guide apparatus in FIG. 1 is engaged with the connecting arm and the connecting arm is in the connected condition.
Figure 6B:
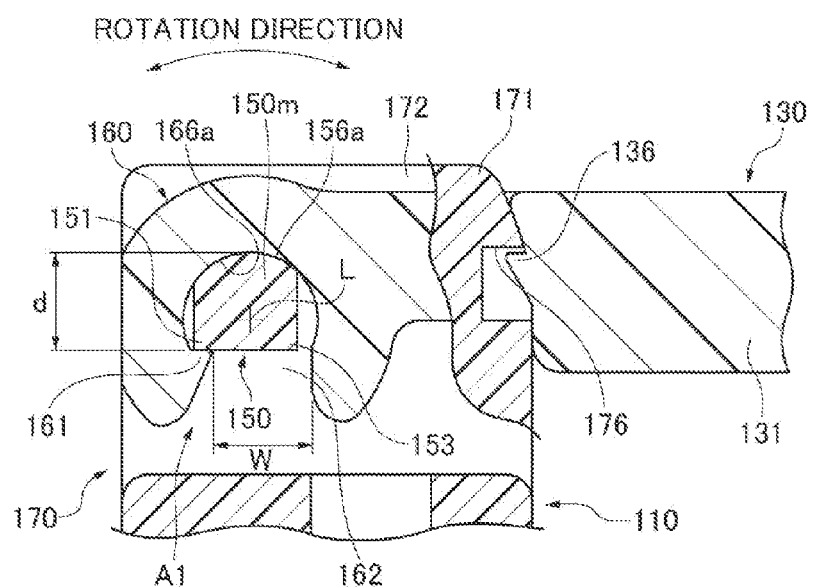
FIG. 6B is a section view in the state shown in FIG. 6A and taken partly along a line 6Bi-6Bi in FIG. 4 and partly along a line 6Bii-6Bii in FIG. 4.

When the first connecting arm 130 is connected, the cutaway opening 162 faces each link plate 110 in the vertical direction (see FIGS. 6A and 6B).

A minimum circumferential width, W, of the cutaway opening 162 is smaller than a minimum outer diameter, d, of the hinge stem 150 (see FIG. 6B) in the hook 160 in a condition referred to as the "natural condition". In the natural condition no external force causing elastic deformation acts on the hook 160 such that the hook 160 is not disengaged from the hinge stem 150.

Hinge stem 150 has an outer circumferential surface 156. The hook 160 has an internal circumferential surface 166 which faces the outer circumferential surface 156 in the radial direction within a rotational range R (see FIG. 10A) with respect to the hinge stem 150.

Accordingly, the internal circumferential surface 166 of the hook 160 rotates with respect to the hinge stem 150) and slidably contacts a portion 156a of the outer circumferential surface 156.

The hinge structure A1 has a disengagement preventing portion, a rotation restricting portion and a return restricting portion. The disengagement preventing portion prevents a phenomenon of disengaging the hook 160 from the hinge stem 150 (referred to as the "arm disengaging phenomenon" hereinafter) caused by the cable applying force acting on the first connecting arm 130. The rotation restricting portion restricts the hook 160 from rotating, i.e., the first connecting arm 130 from rotating, with respect to the hinge stem 150, i.e., to the link plate 110. The return restricting portion restricts the hook 160 from rotating from the rotation restricted condition, in which the first connecting arm 130 is restricted from rotating by the rotation restricting portion, to the connected condition.

The disengagement preventing portion is an engagement structure composed of a pair of link-side engagement elements 151 (concave or step in the present embodiment) as a link-side disengagement preventing engage portion provided on the outer circumferential surface 156 of the hinge stem 150 and an arm-side engagement element 161 (projection in the present embodiment) as an arm-side disengagement preventing engage portion provided on the internal circumferential surface 166 of the hook 160.

Here, a rotational direction of the first connecting arm 130 in which the connected condition of the first connecting arm 130 is shifted in a disconnected condition will be referred to as a disconnecting rotational direction (counterclockwise in FIGS. 6A and 6B) and a rotational direction of the first connecting arm 130 in which the disconnected condition of the first connecting arm 130 is shifted in a connected condition will be referred to as a connecting rotational direction (clockwise in FIGS. 6A and 6B).

When the first connecting arm 130 is in the connected condition, it is possible to prevent the arm disengaging phenomenon as the hook 160 is engaged with the hinge stem 150 in the disconnecting rotational direction. It is noted that the operator can forcibly disengage the engagement of the link-side engagement element 151 and the arm-side engagement element 161 of the disengagement preventing portion.

The hinge stem 150 is one part of the hinge portion. The hinge portion includes the hinge stem 150 and the hook 160.

The hinge stem includes two end portions 150e (see also FIG. 1) as first portions, and an intermediate portion 150m as a second portion.

Hook 160 includes the arm-side engagement element 161 across the whole width of the hook 160. Hinge stem 150 includes link-side engagement element 151 on the both end portions 150e and the intermediate portion 150m, i.e., across the whole width of the hinge stem 150 in the rotation axis direction.

Figure 9A:
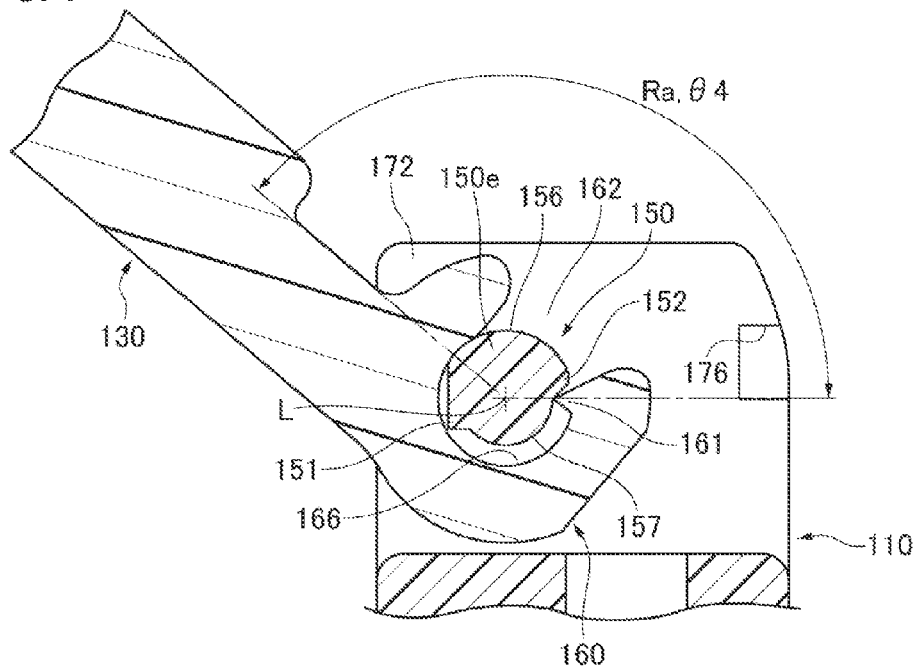
FIG. 9A is a section view corresponding to FIG. 6A illustrating a state when the connecting arm in FIGS. 8A and 8B rotates further in the connection releasing rotational direction.
Figure 10A:
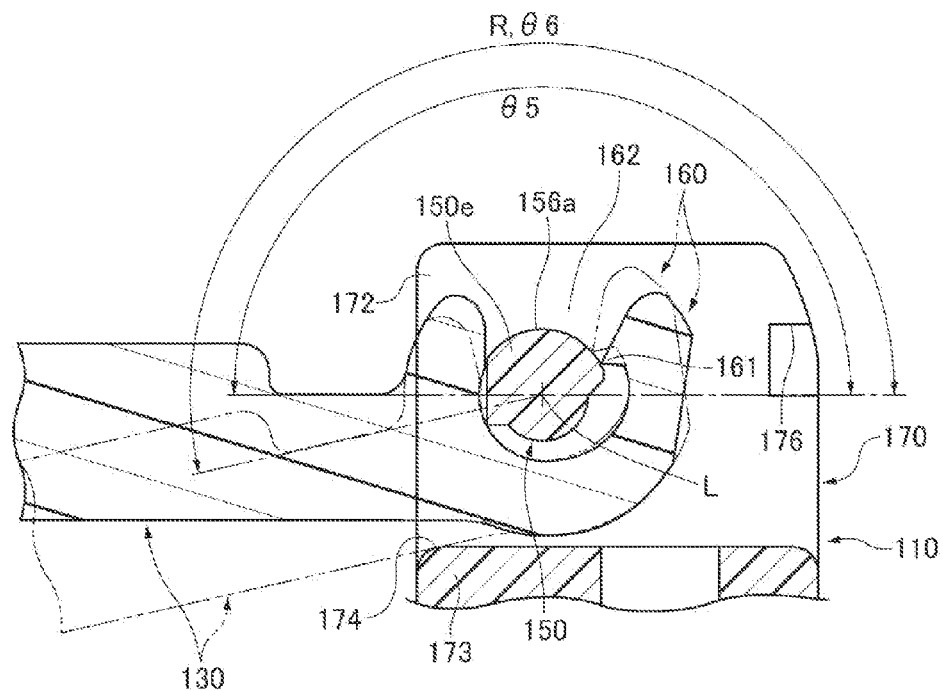
FIG. 10A is a section view corresponding to FIG. 6A illustrating a state when the connecting arm in FIGS. 9A and 9B rotates still further in the connection releasing rotational direction.

Each end portion 150e of the hinge stem 150 has a guide surface 157 that contacts the arm-side engagement element 161 and guides the first connecting arm 130 in the rotational direction within a predetermined rotational range Ra within the rotational range R (see FIGS. 9A and 10A).

The guide surface 157 is formed of a columnar surface and is positioned between the link-side engagement element 151 and another link-side engagement element 152 described later.

Figure 7A:
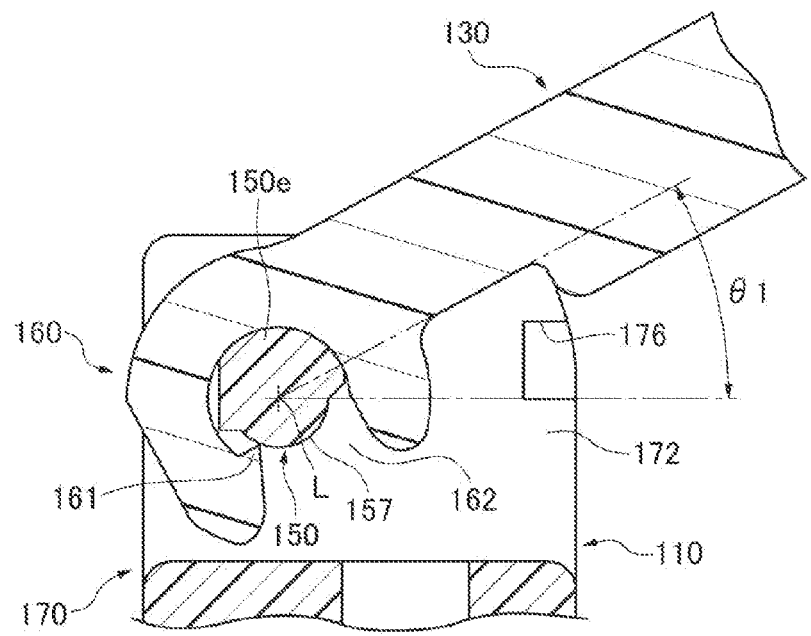
FIG. 7A is a section view corresponding to FIG. 6A illustrating a state when the link plate of the cable protection and guide apparatus in FIG. 1 is engaged with the connecting atm and the connecting arm is in a disconnected state.
Figure 8A:
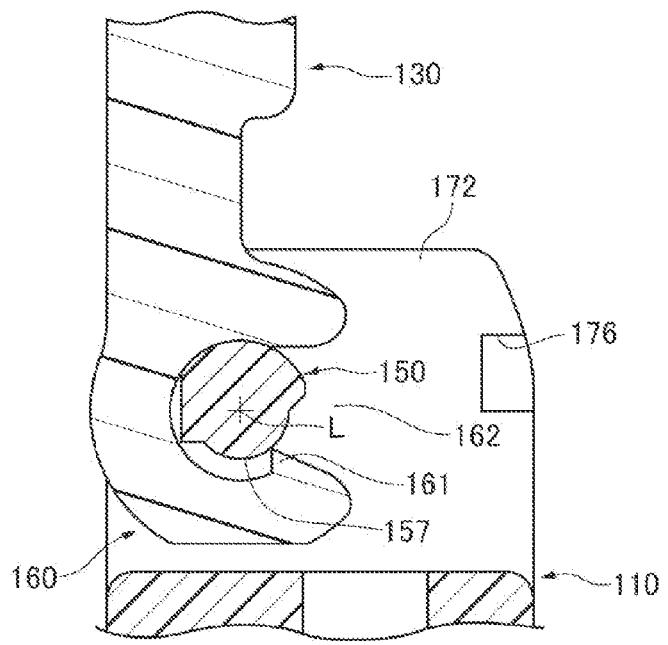
FIG. 8A is a section view corresponding to FIG. 6A illustrating a state when the connecting arm in FIGS. 7A and 7B rotates further in a connection releasing rotational direction.

As shown in FIGS. 7A and 8A, the guide surface 157 is located radially inward of slidable contact surface 156a.

Figure 7B:
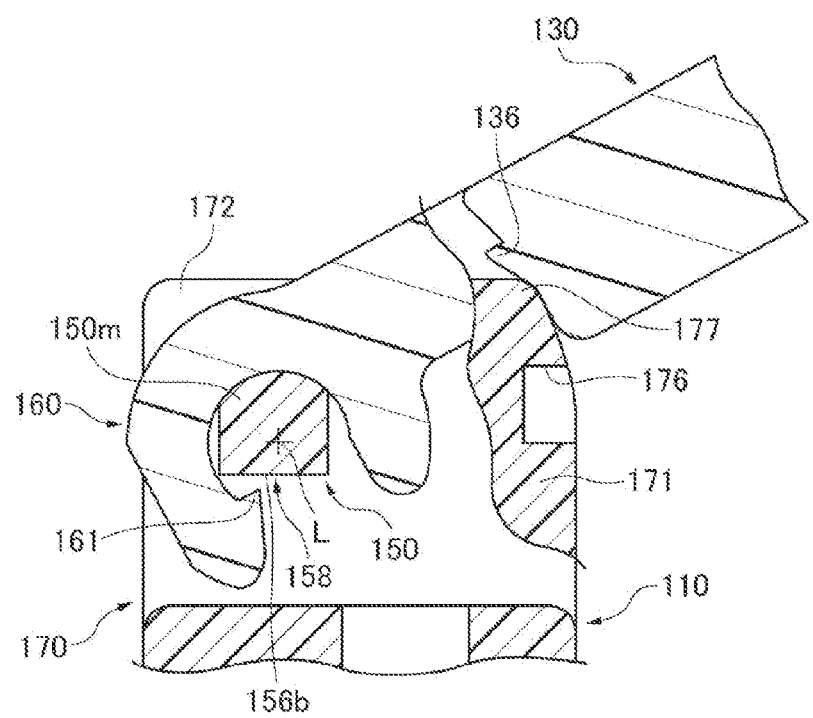
FIG. 7B is a section view, in the state shown in FIG. 7A, corresponding to FIG. 6B.
Figure 8B:
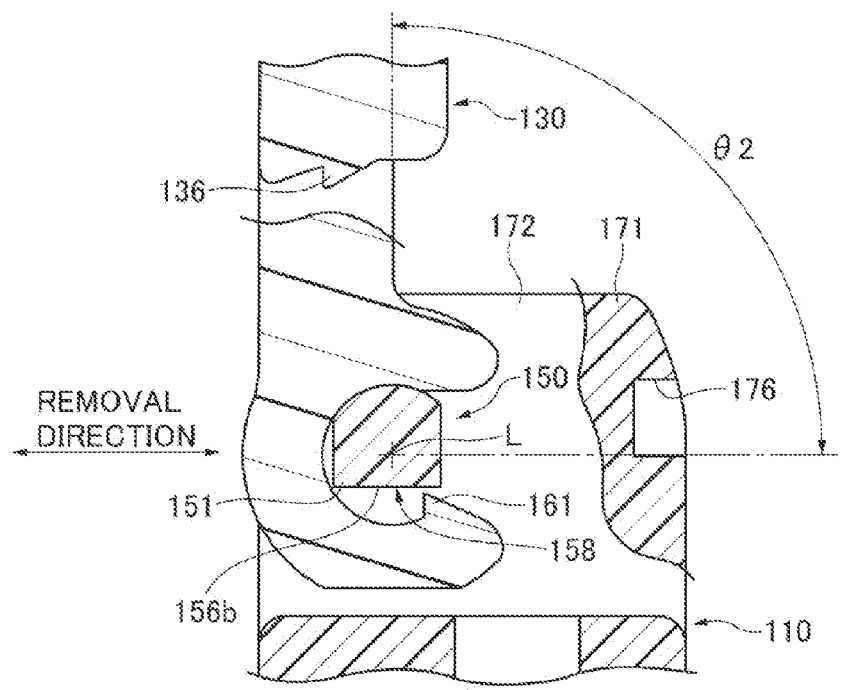
FIG. 8B is a section view, in the state shown in FIG. 8A, corresponding to FIG. 6B.

As shown in FIGS. 7B and 8B, the intermediate portion 150m has a non-contact portion 158 that does not contact the arm-side engagement element 161 in part of the predetermined rotational range Ra.

When the first connecting arm 130 is located at a specific rotational position within the predetermined rotation range Ra where a rotation angle of the first connecting arm 130 from the connected condition is a specific rotation angle θ2 (see FIGS. 8A, 8B and 9), the hook 160 is readily removable with respect to the hinge stem 150 in a removal direction, i.e., the radial direction, with respect to the rotation axis L.

Therefore, when the first connecting arm 130 moves in parallel with the removal direction, the non-contact portion 158 does not contact the arm-side engagement element 161, i.e., a plane substantially in parallel with the rotation axis L and the removal direction.

This specific rotation angle θ2 is 90° or about 90° for example.

The operator can move the first connecting arm 130 so that the arm-side engagement element 161 does not contact surface 156b when the operator moves the first connecting arm 130 in the removal direction.

As shown in FIGS. 6 and 9A, the rotation restricting portion is an engagement element composed of the pair of link-side engagement elements 152 provided on the outer circumferential surface 156 of the hinge stem 150 as a link-side rotation restricting engaging portion (concave or step in the present embodiment) (see also FIG. 4) and one arm-side engagement element 161 provided on the internal circumferential surface 166 of the hook 160 as an arm-side rotation restricting element.

The pair of link-side engagement elements 152 is provided respectively at both end portions 150e of the hinge stem 150. The arm-side engagement element 161 which is the arm-side disengagement preventing engage portion also functions as the arm-side rotation restricting engage portion.

Each link-side engagement element 152 engages the arm-side engagement element 161 when the first connecting arm 130 rotates in the disconnecting rotational direction with respect to the hinge stem 150, so that the hook 160, i.e., the first connecting arm 130, is restricted from rotating with respect to the hinge stem 150, i.e., the link plate 110, in the rotation restricted condition. See FIG. 9A.

In the rotation restricted condition in which the link-side engagement elements 152 abut the arm-side engagement element 161, a restricting rotation angle θ4, i.e., the rotation angle θ of the first connecting arm 130, is an obtuse angle and is preferably 125° to 145°.

Because the pair of guide surfaces 157 is provided respectively at the both end portions 150e, the first connecting arm 130 is allowed to rotate smoothly from the connected condition to the rotation restricted condition without being twisted.

Figure 9B:
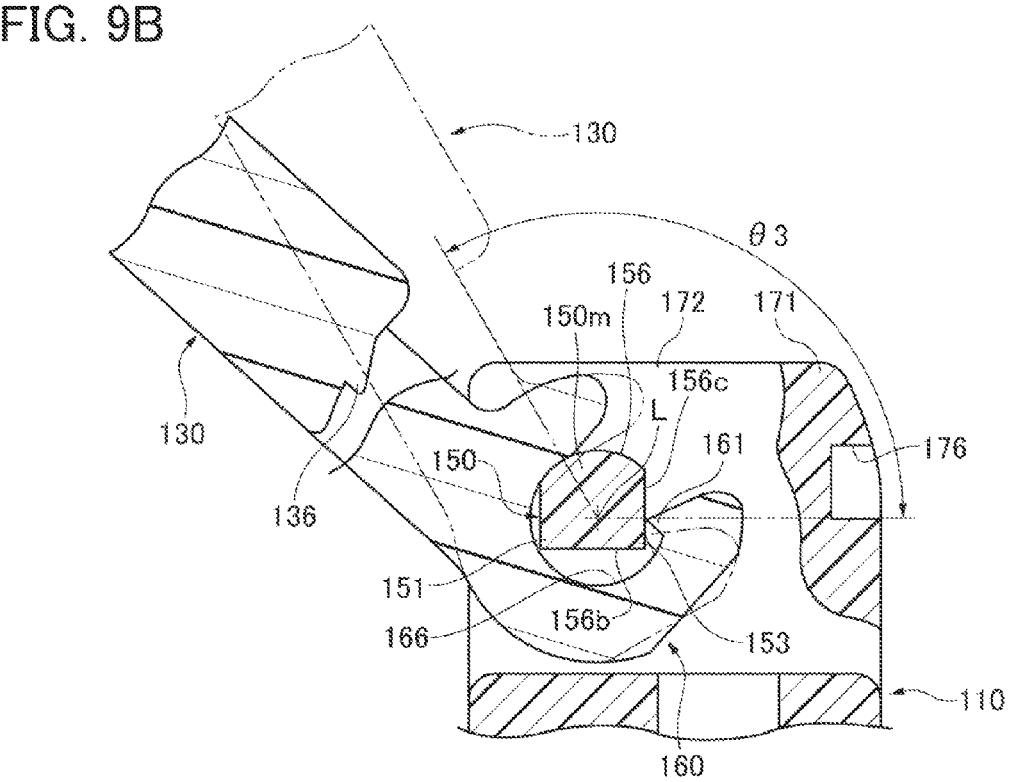
FIG. 9B is a section view, in the state shown in FIG. 9A, corresponding to FIG. 6B.

As shown in FIGS. 6 and 9B, the return restricting portion is a link-side engagement element 153 (corner or projection in the present embodiment). Link-side engagement element 153 is a link-side return restricting engage portion provided on the surface 156 of the hinge stem 150. The arm-side engagement element 161 is an arm-side return restricting engage portion provided on the surface 166 of hook 160.

In the intermediate portion 150m of the hinge stem 150, the link-side engagement element 153 is between the link-side engagement element 151 and the link-side engagement element 152.

When the arm-side engagement element 161 engages the link-side engagement element 153, the connecting arm is put into a return restricting condition in which the rotation of the hook 160, i.e., the rotation of the first connecting arm 130, from the rotation restricted condition to the connected condition is restricted as shown in FIG. 9B by a two-dot chain line.

In the rotation restricted condition, a return restricting rotation angle θ3, i.e., the rotation angle θ, is an obtuse angle smaller than the restricting rotation angle θ4.

This return restricting rotation angle θ3 is set at an angle so that a difference between rotation angles θ3 and θ4 is more than 0° and less than 30°.

It is noted that the operator can forcibly release the engagement between the link-side engagement element 152 and the arm-side engagement element 161 of the rotation restricting portion and between the link-side engagement element 153 and the arm-side engagement element 161 of the return restricting portion.

Figure 10B:
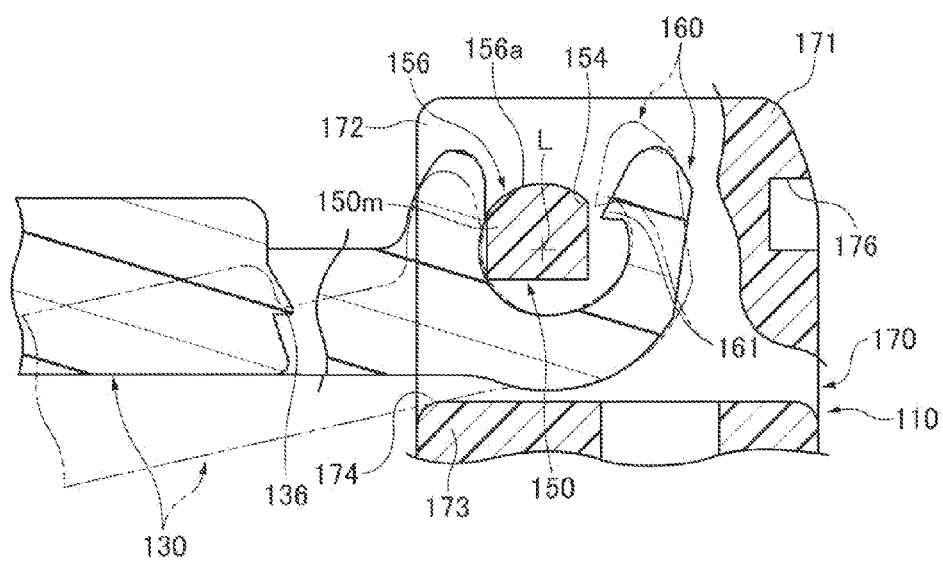
FIG. 10B is a section view, in the state shown in FIG. 10A, corresponding to FIG. 6B.

As shown in FIGS. 10A and 10B, when the operator forcibly releases the engagement between the link-side engagement element 152 and the arm-side engagement element 161 of the rotation restricting portion, the first connecting arm 130 rotates by exceeding the restricting rotation angle θ4 (see FIG. 9A).

When the rotation angle θ exceeds the restricting rotation angle θ4 and reaches a large rotation angle θ5, the hook 160 is elastically deformed and opened, i.e., the cutaway opening 162 is widened as the arm-side engagement element 161 slides along surface 156a at the respective end portions 150e. The arm-side engagement element 161 is put into a state not contacting the intermediate portion 150m of the hinge 150.

It is noted that FIGS. 10A and 10B show the first connecting arm 130 when the large rotation angle θ5 is 180° by a solid line.

When the operator rotates the first connecting arm 130 further in the disconnecting rotational direction, the hook 160 abuts a stopper 174 composed of a bottom wall 173 of the storage portion 170. Thus, the rotation angle θ of the first connecting arm 130 becomes the maximum rotation angle θ6 and the first connecting arm 130 assumes the maximum rotational position.

This maximum rotation angle θ6 is a value greater than 180° and is between 190° and 200° centering on 195° for example. The value of θ6 may exceed 200°.

During the process when the rotation angle θ of the first connecting arm 130 exceeds the large rotation angle θ5 and reaches the maximum rotation angle θ6, the arm-side engagement element 161 may contact the slidable contact surface 156a at both end portions 150e and the intermediate portion 150m so that the whole arm-side engagement element 161 contacts the hinge stem 150.

As shown in FIGS. 4 through 6, the disengagement preventing attachment structure provided in the first connecting arm 130 and the respective link plates 110 is composed of a pair of link-side engagement elements 176 (concave in the present embodiment) in a pair of side walls 171 and 172 of the storage portion 170. A pair of arm-side engagement elements 136 (projection in the present embodiment) reside on the body portion 131.

The respective link-side engagement elements 176 are provided in the respective side walls 171 and 172.

The arm-side engagement elements 136 project in the transverse direction from a pair of shoulder portions 133 that are parts of the both end portions 132 of the body portion 131 of the connecting arm 130.

When the first connecting arm 130 is in the connected condition, it is possible to prevent the arm disengaging phenomenon by engaging the link-side engagement element 151 and the arm-side engagement element 161 and by engaging the both link-side engagement elements 176 and the both arm-side engagement elements 136.

Still further, when the rotation angle θ is an acute angle as shown in FIGS. 7A and 7B, it is possible to restrict the rotation of the first connecting arm 130 in the connecting rotational direction by engaging (or abutting) the arm-side engagement elements 136 with the second link-side return restricting engage portions 177 on the pair of side walls 171 and 172. The predetermined rotation angle θ1, i.e., the rotation angle θ at this time, is 20° to 35°.

It is noted that the operator can forcibly release this engagement between the arm-side engagement elements 136 and the side walls 171 and 172.

However, when the first connecting arm 130 is in the connected condition and the disengagement preventing portion and the disengagement preventing attachment structure are in the engaged condition, although it is possible to release the engagement of the disengagement preventing portion to detach the first connecting arm 130 by means of a tool, it is difficult to release the engagement manually.

Because the first connecting arm 130 is open and disposed between the pair of link plates 110 and 120 in the transverse direction by keeping the first connecting arm 130 at the predetermined rotation angle θ1, it is possible to hold the first connecting arm 130 in a relatively compact condition. The rotation of the first connecting arm 130 to the restricting rotation angle θ4 (see FIG. 9A) is quick and easy, thus contributing to easy insertion of the cable, C.

As shown in FIG. 6B, the engagement of the link-side engagement element 176 with the arm-side engagement element 136 restricts the link plate 110 from rotating clockwise centering on the rotation axis L, and the engagement of the link-side engagement element 151 with the arm-side engagement element 161 restricts the link plate 110 from rotating counterclockwise centering on the rotation axis L.

Put another way, the arm-side engagement element 136 engages concave element 176 and prevents rotation of the arm 130 in a counterclockwise direction.

Next, the operations and effects of the embodiment configured as described above will be explained.

The cable protection and guide apparatus 100 has the attachment structure A for removably attaching the connecting arm 130 to the pair of link plates 110, 120. The attachment structure A has the hinge structure composed of the hinge stem 150 and the hook 160. The hook 160 engages with the hinge stem 150 when the first connecting arm 130 is in the connected condition. The hook engages with the hinge stem 150 rotatably so that the first connecting arm 130 rotates centering on the rotation axis L that extends in the longitudinal direction. The cable and/or hoses are accommodated within the accommodating space. The accommodating space is formed by: the pair of link plates 110 and 120 of each link row 102 of the link row group 101; and, the first and second connecting arms 130, 140 connecting the pair of link plates 110, 120 of the link row 102.

With this arrangement, it is possible to protect and guide the cables and/or hoses within the accommodating space.

Because the first connecting arm 130 rotates centering on the rotation axis L that extends in the longitudinal direction and the first connecting arm 130 in the disconnected condition is rotated while being engaged with the hinge stem 150, it is possible to insert the cables into the accommodating space (or the link row group 101) and to improve the efficiency of the insertion process.

The hinge structure A1 has the rotation restricting portion that restricts the rotation of the first connecting arm 130 in the disconnected condition, and the rotation restricting portion is composed of the link-side engagement elements 152 provided around the hinge stem 150 and the arm-side engagement element 161 provided on the hook 160. In the rotation restricted condition in which the rotation of the first connecting arm 130 is restricted by the engagement of the link-side engagement elements 152 and the arm-side engagement element 161, the restricting rotation angle θ4, i.e., the rotation angle θ of the first connecting arm 130, is an obtuse angle.

In the cable protection and guide apparatus 100, the hinge stem 150 has the outer surface 156 and the hook 160 has the surface 166 that is opposed radially to the outer surface 156 within the rotation range R of the first connecting arm 130. The hinge structure A1 has the disengagement preventing portion that prevents the arm disengaging phenomenon of disengaging the hook 160 from the hinge stem 150 caused by the force acting on the arm 130. The disengagement preventing portion is composed of the pair of link-side engagement elements 151 provided on the outer surface 156 of the hinge stem 150 and the arm-side engagement element 161 provided on the surface 166 of the hook 160. Then, when the first connecting arm 130 is in the connected condition, the arm disengaging phenomenon is prevented by engaging the link-side engagement elements 151 with the arm-side engagement element 161.

With this arrangement, the disengagement preventing portion that prevents the arm disengaging phenomenon of disengaging the first connecting arm 130 by the external force from the cable is provided on the surface 166. It is possible to downsize (make smaller) the hinge stem 150 and the hook 160 on which the link-side engagement element 151 and the arm-side engagement element 161 are provided.

Accordingly, it is possible to use the hinge structure A1 having the disengagement preventing portion in a small-type cable protection and guide apparatus 100.

The arm-side engagement element 161 of the disengagement preventing portion functions also as the arm-side rotation restricting engaging portion of the rotation restricting portion, so that the structure of the hook 160 in which the disengagement preventing engage portion and the rotation restricting engage portion are provided is simplified.

The hinge stem 150 is divided into the pair of end portions 150e and the intermediate portion of the hinge stem 150m in the rotation axis direction. Each end portion 150e has the guide surface 157 that contacts the arm-side engagement element 161 provided on the hook 160 within the predetermined rotation range Ra and guides the first connecting arm 130 in the rotational direction, and the intermediate portion 150*m* has the non-contact portion 158 that does not contact the arm-side engagement element 161 within the predetermined rotation range Ra.

This arrangement facilitates the removal of the hook 160 provided with the arm-side engagement element 161 from the hinge stem 150 by utilizing the non-contact portion 158 of the hinge stem 150.

Because the first connecting arm 130 rotates in the condition in which the arm-side engagement element 161 is guided by the guide surface 157, it is possible to smoothly rotate the first connecting arm 130.

When the first connecting arm 130 is located at the angle of the specific rotation angle θ2, i.e., the specific rotational position within the predetermined rotation range R, the hook 160 is removable from the hinge stem 150. See FIGS. 8A and 8B.

This arrangement facilitates the removal of the hook 160 from the hinge stem 150 and improves the assemble-ability of the first connecting arm 130.

The first connecting arm 130 has the body portion 131 extending between the pair of link plates 110, 120 in the connected condition and the pair of hooks 160 extending from both end portions of the body portion 131. The attachment structure A has the disengagement preventing attachment structure for preventing the arm disengaging phenomenon. The disengagement preventing attachment structure is composed of the link-side engagement elements 176 provided on the respective link plates 110. When the first connecting arm 130 is in the connected condition, the engagement of the link-side engagement elements 176 with the arm-side engagement elements 136 prevents the arm disengaging phenomenon.

When the first connecting arm 130 is in the connected condition, the arm disengaging phenomenon is prevented by: engaging the link-side engagement element 151 and the arm-side engagement element 161; and, engaging the link-side engagement elements 176 and the arm-side engagement elements 136.

This arrangement prevents the respective link plates 110, 120 from rotating and falling around the rotation axis L caused by the cable.

The hinge structure A1 has the return restricting portion that restricts the first connecting arm 130 from rotating from the rotation restricted condition to the connected condition. The return restricting portion is composed of the link-side engagement element 153 provided in the hinge stem 150 and the arm-side engagement element 161 provided in the hook 160 as illustrated in FIG. 9B. In the return restricting condition in which the first connecting arm 130 is restricted from rotating from the rotation restricted condition, the return restricting rotation angle θ3, is the obtuse angle smaller than the restricting rotation angle θ4.

This arrangement allows the rotation angle to be kept stably in the obtuse angle state within the range of the restricting rotation angle θ4 set by the rotation restricting portion and the return restricting rotation angle θ3 set by the return restricting portion, so that it is possible to improve the efficiency of the insertion process of the cable C into the accommodating space.

Each of the link plates 110, 120 and the connecting arms 130 is integrally molded. The hardness of the material forming the link plates 110, 120 is less than the hardness of the material forming the first connecting arm 130.

The link plates 110, 120 whose hardness is relatively small, will readily deform when parts of the respective link plates 110, 120 and the connecting arm 130 rub/engage each other. When the hook 160 is removably attached to the hinge stem 150, or, when the operator forcibly engages or disengages the engagement elements, e.g., the engagement elements 151 through 153 of the plate deform with respect to the harder the arm-side engagement element 161.

Accordingly, it is possible to reduce wear of the attachment structures A and B including the hinge structure A1 and to improve durability of the attachment structures A and B as well as the cable protection and guide apparatus 100.

Because the hook 160 of the first connecting arm 130 has the shape whose section is arc-shaped due to the cutaway opening 162 and is liable to deform due to external force as compared to the hinge stem 150, wear of the connecting arm 130 is suppressed.

Modified examples obtained by modifying parts of the configuration of the embodiment described above will be explained below regarding the modified configurations.

The link-side hinge portion may be hook-like and the arm-side hinge portion may be shaft-like. In this case, a link-side circumferential surface is an internal circumferential surface of the link-side hinge portion and an arm-side circumferential surface is an outer circumferential surface of the arm-side hinge portion.

The rotation restricting portion and the return restricting portion may be parts other than the outer surface 156 of the hinge stem 150 and the internal surface 166 of the hook 160, e.g., a surface facing to the rotation axis direction.

The arm-side disengagement preventing engage portion and the arm-side rotation restricting engage portion may be different engaging portions.

The hardness of the material forming the first connecting arm 130 may be smaller than the hardness of the material forming the respective link plates 110, 120. The durability improves also in this case.

The first and second portions may be continuous or may be divided in the rotation axis direction. The first portion may be composed of one region or of a plurality of regions of three or more, and the second portion may be composed of a plurality of regions.

Still further, the first portion may be a region, e.g., the intermediate portion, other than the end portion in the rotation axis direction, and the second portion may be a region, e.g., the end portion, other than the intermediate portion in the rotation axis direction.

Still further, the hook 160 may have the first and second portions, instead of the hinge stem 150, and the hinge stem 150 and the hook 160 may have them. Then, one hinge portion may be the hook 160 and the other hinge portion may be the hinge stem 150.

In addition to the first connecting arm 130, the second connecting arm 140 may be attached to the pair of link plates 110, 120 by the attachment structure A. That is, at least one of the first connecting arm 130 and the second connecting arm 140 may be removably attached to the pair of link plates 110 and 120 by the attachment structure A.

At least one connecting arm among the first and second connecting arms 130, 140 may be attached to one of the pair of link plates 110, 120 by the attachment structure A and the other end may be attached by a known attachment structure that permits to be removable.

The hinge stem 150 may be provided integrally, i.e., so as not to be removably, with the pair of link plates 110 and 120 by integral molding for example.

The specific mode of the cable protection and guide apparatus of the present invention may take any mode as long as the guide apparatus comprises the link row group composed of the plurality of link rows connected in the longitudinal direction and the pluralities of first and second connecting arms.

Each link row is composed of the pair of link plates disposed separately from each other in the transverse direction. The link plates of adjacent rows of link plates are adjacent each other in the longitudinal direction, and are articulately and bendably connected together. The attachment structure for removably attaching at least one connecting arm to the link plate has the hinge structure composed of the link-side hinge portion of the link plate and the arm-side hinge portion of the connecting arm. The arm-side hinge portion engages with the link-side hinge portion in the connected condition and engages the link-side hinge portion rotatably so that the connecting arm rotates on the rotation axis.

For instance, the attachment structure of the invention may be provided at one end portion or both end portions of the connecting arm in the transverse direction.

Instead of cables and hoses, other things may be used in the accommodating space if they are flexible linear objects such as electrical cable for supplying power or transmitting signals and/or hoses for guiding substances including fluid in the machines.

What is claimed is:

1. A cable protection and guide apparatus, comprising:
   a link row group;
   said link row group includes a longitudinal direction and a transverse direction;
   said link row group includes a plurality of link rows;
   said plurality of link rows are connected in a longitudinal direction of said guide apparatus;
   each link row includes a pair of link plates laterally and separately disposed from each other in a transverse direction of said guide apparatus;
   each of said pair of link plates includes left and right link plates;
   each of said left and right link plates are articulately and bendably connected to each other in a longitudinal direction enabling the link plates to form a flexional circumferential bend having a flexional inner circumferential side and flexional outer circumferential side during bending;
   each of said link plates includes a flexional inner circumferential side residing during bending on said flexional inner circumferential side of said bend;
   each of said link plates includes a flexional outer circumferential side residing during bending on said outer flexional circumferential side of said bend;
   a plurality of first and second connecting arms;
   each said link row includes one of said first connecting arms and one of said second connecting arms configured to crosslink said left and right link plates respectively on said flexional inner and outer circumferential sides, respectively;
   a cable, said cable is inserted through said link rows between a stationary end and a mobile end;
   each of said left and right link plates includes a link-side hinge portion, each of said link-side hinge portions includes a hinge stem, each of said hinge stems is oriented in said longitudinal direction, and each of said hinge stems includes an axis of rotation oriented in said longitudinal direction;
   each of said first connecting arms includes a first end and a second end;
   said first end of each of said first connecting arms includes an arm-side hinge portion, said arm-side hinge portion of said first end includes a hook portion;
   said second end of each of said first connecting arms includes an arm-side hinge portion, said arm-side hinge portion of said second end includes a hook portion;
   said hook portion of said first end of one of said first connecting arms engages said hinge stem of said right link plate and said hook portion of said second end of said one of said first connecting arms engages said hinge stem of said left link plate when said one of said first connecting arms is in a connected condition;
   when said one of said first connecting arms is disconnected from said right side link plate, said hook portion of said first end of one of said first connecting arms does not engage said hinge stem of said right link plate and said hook portion of said second end of said one of said first connecting arms engages said hinge stem of said left link plate rotatably such that said one of said first connecting arms rotates centering on said axis of rotation of said hinge stem extending in said longitudinal direction;
   each of said left and right link plates includes a rotation restricting portion, each said rotation restricting portion of said left and right link plates includes return restricting engagement portions of said hinge stem; each of said first and second ends of said first connecting arms includes a rotation restricting portion, each said rotation restricting portion of said first and second ends of said connecting arms includes a projection extending from said hook portion thereof; said projection extending from said hook portion of said second end of said one of said first connecting arms engaging said return restricting portion of said hinge stem, a restricting rotation angle, and, said restricting rotation angle of said first connecting arm is an obtuse angle; an accommodating space, said accommodating space formed by said pair of link plates of each link row of said link row group and by said first and second connecting arms connecting said pair of link plates of the link row; and,
   said cable residing within said accommodating space.

2. The cable protection and guide apparatus according to claim 1, further comprising:
   said hinge stem of said left side link plate includes a surface that surrounds said axis of rotation;
   said hook portion of said second end portion of said one of said first connecting arms includes a surface surrounding said axis of rotation and is opposed radially to said surface of said hinge stem of said left side link plate;
   said left side link plate includes a pair of link-side disengagement preventing engage portions provided on said hinge stem;
   said hook portion of said second end portion of said one of said first connecting arms includes an arm-side disengagement preventing engage portions provided on said arm-side circumferential surface;
   when one of said first connecting arms is in said connected condition, said arm is prevented from disengagement by engagement of said link-side disengagement preventing engage portion on said hinge stem and said arm-side disengagement preventing engage portion.

3. The cable protection and guide apparatus according to claim 2, wherein said arm-side disengagement preventing engage portion also functions as said arm-side rotation restricting engage portion.

4. The cable protection and guide apparatus according to claim 2, further comprising:
   said hinge stem of said left side link plate is divided into first portions and a second portion along said axis of rotation in said longitudinal direction;

said second end of said one of said first connecting arms includes said hook, said hook of said second end includes a projection;

said first portions of said hinge stem include guide surfaces;

said second portion of said hinge stem has a non-contact portion that does not contact said other disengagement preventing engage portion, i.e., said arm-side disengagement prevent engage portion within a predetermined rotation range; and, said projection of said hook of said second end portion engages said first portion of said hinge stem within said predetermined rotation range and guides said connecting arm.

5. The cable protection and guide apparatus according to claim 4, wherein:

when said one of said connecting arms is located at a 90° angle with respect to said connected position, said arm-side hinge portion is removable from said hinge stem in a removable direction; and said non-contact portion of said hinge stem does not contact said other disengagement preventing engage portion when said connecting arm is moved in parallel with said removable direction.

6. The cable protection and guide apparatus according to claim 2, wherein:

said one of said first connecting arms has a body portion extending between said pair of right and left link plates in said connected condition;

each of said right and left link plates includes second link-side disengagement preventing engage portions;

said body portion of said one of said first connecting arms includes an intermediate portion between said first and second ends thereof;

said one of said first connecting arms includes second arm-side disengagement preventing engage portions provided on said body portion of said one of said first connecting arms; and, when one of said first connecting arms is in said connected condition, engagement of said second link-side disengagement preventing engage portions with said second arm-side disengagement preventing engage portions prevents disengagement of said arm.

7. The cable protection and guide apparatus according to claim 6, wherein:

said one of said first connecting arm is removably attached to said pair of right and left link plates; and, said second connecting arm is removably attached to said pair of right and left link plates.

8. The cable protection and guide apparatus according to claim 1, further comprising:

said one of said connecting arms includes a return restricting portion that restricts rotation to said connected condition;

said hinge stem includes a return restricting portion;

said hook of said one of said connecting arms includes a projection; and in the return restricting condition in which the rotation of said one of said connecting arms is restricted by the engagement of said projection of said hook and hinge stem return restricting portion, a return restricting rotation angle which is the rotation angle of said one of said connecting arms is an obtuse angle smaller than the restricting rotation angle.

9. The cable protection and guide apparatus according to claim 1, wherein:

each of said link plates and said connecting arms is an integrally molded member; and, hardness of a material forming said pair of right and left link plates is greater than the hardness of said one of said connecting arms.

10. The cable protection and guide apparatus according to claim 1, wherein:

each of said link plates and said connecting arms is an integrally molded member; and, hardness of a material forming said one of said connecting arms is greater than the hardness of said pair of right and left link plates.

\* \* \* \* \*

UNITED STATES PATENT AND TRADEMARK OFFICE
CERTIFICATE OF CORRECTION

Page 1 of 1

PATENT NO. : 8,807,490 B2
APPLICATION NO. : 13/558882
DATED : August 19, 2014
INVENTOR(S) : Komiya It is certified that error appears in the above-identified patent and that said Letters Patent is hereby corrected as shown below:

In the Specification

Col. 9, line 8, after "connecting" delete "atm" and insert --arm-- therefor.

Col. 13, line 55, after "rotation)" delete "L1" and insert --L-- therefor.

Signed and Sealed this
Second Day of December, 2014

Michelle K. Lee
*Deputy Director of the United States Patent and Trademark Office*